March 16, 1965 W. L. DRAYER Re. 25,744

METHOD AND APPARATUS FOR ATOMIZING LIQUID

Original Filed March 5, 1962 2 Sheets-Sheet 1

INVENTOR.
BY William L. Drayer
W. F. Wagner
ATTORNEY

METHOD AND APPARATUS FOR ATOMIZING LIQUID

Original Filed March 5, 1962 2 Sheets-Sheet 2

INVENTOR.
William L. Drayer
BY
W. F. Wagner
ATTORNEY

United States Patent Office

Re. 25,744
Reissued Mar. 16, 1965

25,744

METHOD AND APPARATUS FOR ATOMIZING LIQUID

William L. Drayer, Warren, Mich., assignor to General Motors Corporation, Detroit, Mich., a corporation of Delaware Original No. 3,123,302, dated Mar. 3, 1964, Ser. No. 177,601, Mar. 5, 1962. Application for reissue Apr. 27, 1964, Ser. No. 377,151
10 Claims. (Cl. 239—4)

Matter enclosed in heavy brackets [ ] appears in the original patent but forms no part of this reissue specification; matter printed in italics indicates the additions made by reissue.

The subject matter of this invention is an improved method and apparatus for atomizing a liquid by means of vibratory energy.

It is well known that liquid can be atomized by conducting it against a vibratory member such as a diaphragm or reed so as to mechanically break up and disperse the liquid in droplet form. However, such atomizers have not met with wide commercial success for the reason that the systems heretofore proposed have not been capable of efficiently producing the fine droplet size and dispersion pattern desired so as to be competitive with more conventional types of atomizers, for example those of the air pressure type or of the type wherein the liquid to be atomized is itself pressurized so as to cause it to disperse upon egress from a restricted opening.

One of the objects of the present invention is the provision of a method which efficiently utilizes vibratory energy to atomize a liquid stream into extremely fine droplets and form a dispersion pattern of desirable size and shape. Another object is the provision of a vibratory atomizer which is of relatively simple low-cost construction and yet which extremely efficiently utilizes the vibrating energy input to furnish optimum liquid atomization and dispersion.

Briefly, my invention comprehends a method for atomizing a liquid which comprises flowing a liquid through and from the free end of a resilient tube in which there is set up a gyratory vibration such that the free end of the tube is caused to orbit at a frequency in the sonic range. Optimum efficiency is attained by vibrating the tube at its natural resonant frequency so as to set up a standing flexural wave therein. For the practice of such method, the atomizing apparatus of this invention includes an orbital mass type vibrator which is coupled to a resilient tube which is suitably supported at a point spaced from its outlet and is connected to a source of the liquid to be atomized. Hence, the vibrator can generate a standing gyratory flexural wave in the tube so as to cause the free outlet end thereof to vibrate in an orbital motion at a frequency in the sonic range, such vibration being effective to cause liquid flowing through the tube to egress from the outlet end in a conically shaped pattern of extremely fine mistlike droplets. The vibrator for the apparatus preferably comprises a ringshaped mass or rotor which loosely encircles the resilient tube and is driven by air pressure around the tube in hula-hoop fashion. To attain optimum atomization together with a good dispersion pattern the frequency of vibration should be at least 100 cycles per second and preferably higher as will be specified in greater detail hereinafter.

Other objects, features and advantages of the invention will appear more clearly from the following detailed description of preferred embodiments thereof made with reference to the accompanying drawings in which.

Figure 7:
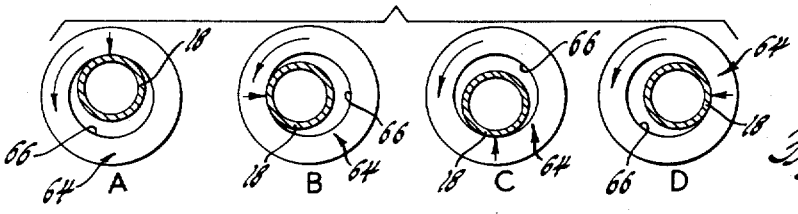
Figure 8:
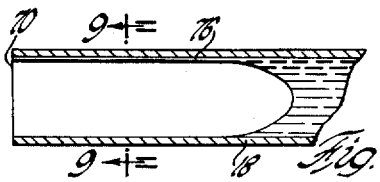
Figure 9:
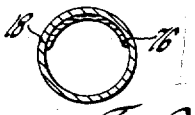

FIGURE 7 diagrammatically illustrates several positions of the vibrator rotor as it orbits about the tube;

FIGURE 8 illustrates the form taken by the liquid in the tube during atomization; and FIGURE 9 is a section taken on lines 9—9 of FIGURE 8.

Figure 1:
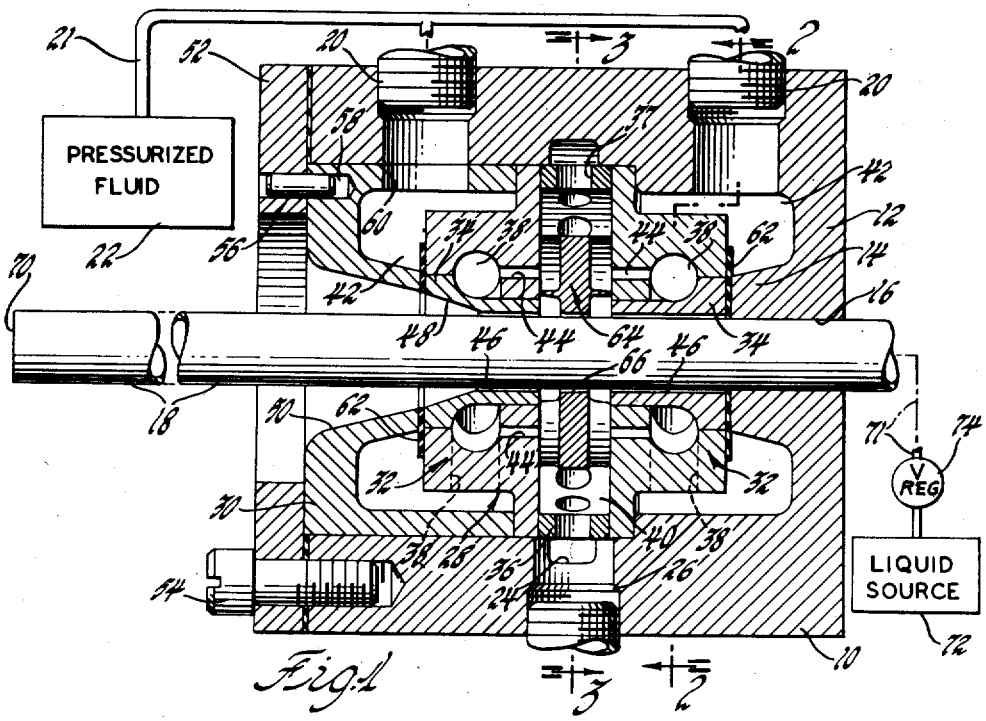
FIGURE 1 is a sectional longitudinal view of an atomizer constructed in accordance with the invention.
Figure 2:
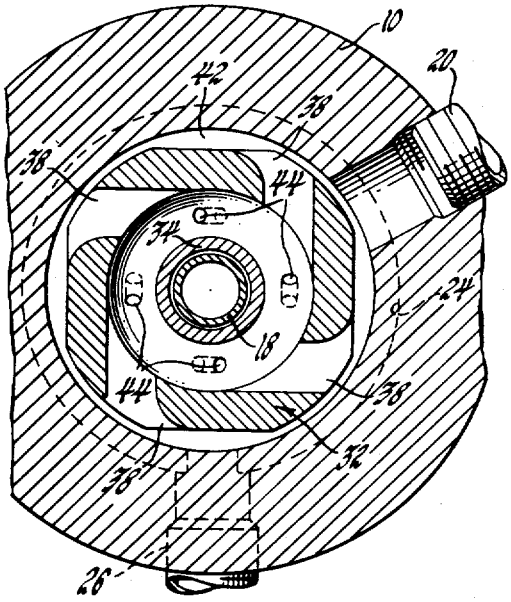
FIGURE 2 is a section taken on lines 2—2 of FIGURE 1.
Figure 3:
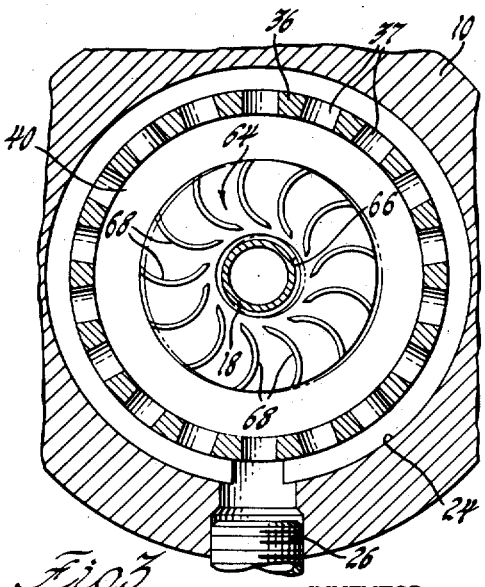
FIGURE 3 is a section taken on lines 3—3 of FIGURE 1.

Referring now to the drawings and specifically to FIGURES 1 through 3, a liquid atomizer constructed in accordance with the invention is shown comprising a cylindrical housing 10 having an enlarged cavity formed therein and being closed at one end by an integral wall 12. An axially extending boss 14 is centrally formed with the wall 12 and has a bore 16 therein for fixedly restraining a portion of an elongated tube or conduit 18 for purposes which will hereinafter be explained. A pair of spaced fluid inlet ports 20 are formed in the housing along the longitudinal axis thereof and are connected through a fluid line 21 to a source of pressurized fluid 22. In addition, an annular groove 24 is located in the cavity portion of the housing midway between the fluid inlet ports 20 and communicates with a fluid outlet port 26 formed in the lower portion of the housing 10.

A vibrator generally indicated by the numeral 28 is operatively coupled to the tube 18 and is mounted within the housing between the boss 14 and a support member 30. The vibrator includes a pair of annular hat-shaped outer sections 32, a pair of spool shaped inner sections 34, and a ring type spacer 36, all of which cooperate to define a plurality of fluid inlet passages 38 and a working chamber 40. One end of each fluid passage 38 opens into one of a pair of annular fluid chambers 42, while the other end of each passage terminates with an orifice 44 that extends parallel to one of a pair of mutually perpendicular centerlines as shown in FIGURE 2.

A plurality of radial ports 37 are formed in the spacer 36 and serve to exhaust fluid from the working chamber 40 to the groove 24 which communicates with the outlet port 26. Each inner section 34 includes a bore 46 of a diameter greater than the tube outer diameter and the bore in the section adjacent the open end of the housing tapers outwardly at 48 in line with a conical bore 50 in the support member 30. A face plate 52 is rigidly secured to the open end of the housing 10 by a plurality of cap screws one of which is indicated at 54 to retain the vibrator assembly in position within the housing through the support member 30 which also coacts with one of the inner sections 32 to define one of the annular fluid chambers 42. A locating pin 56 extends through the face plate 52 into an appropriate bore 58 formed in the support member 30 for purposes of aligning an opening 60, formed in the periphery of the support member, with one of the fluid inlet ports 20. When the vibrator is assembled in the housing, gasket members 62 are provided on opposite sides of the vibrator 28 for sealing the parting plates existing between the inner and outer sections 32, 34 and thereby preclude any fluid leakage at these points.

A rotor 64 having an enlarged circular opening 66 through which the tube 18 extends is provided in the working chamber 40 and has a plurality of equally spaced arcuate vanes 68 formed on the opposite sides thereof. The vanes extend axially from the rotor body and are located adjacent the several orifices 44 each of which serve to direct a stream of high velocity fluid in a direction normal to the vane surfaces. The tube 18 is made from a tough plastic material such as nylon and extends through the vibrator 28 and terminates a distance beyond the housing with a liquid outlet or nozzle 70. A line 71 connects a source of liquid 72 to one end of the tube 18 for providing a metered amount of liquid to the outlet 70 under the control of the regulator valve 74.

In operation, the vibrator 28 is energized by compressed air entering the housing through the inlet ports 20 and flowing through the chambers 42 into the several tangential passages 38 formed on both sides of the vibrator. The air leaves the passages via the orifices 44 as a high velocity stream which impinges on the curved rotor vanes 68 to drive the rotor 64 about the tube 18. The rotor opening 66 is of a diameter greater than the outer diameter of the tube resulting in the rotor following an orbital path around the tube in a hula-hoop manner. This movement is shown in FIGURE 7 and for illustrative purposes, the rotor opening 66 is much larger than the tube outer diameter and the rotor is being driven by the air streams in a counterclockwise direction. As the rotor 64 orbits around the tube 18, a centrifugal force acts at the point of contact between the rotor and tube in a direction toward the center of the tube and as the rotor moves through the positions indicated as A, B, C and D, the centrifugal force is applied, as indicated by the arrow, at different points around the tube so as to create, in effect, a rotating force vector.

The hula-hoop movement of the rotor about the tube results in a step-up in frequency which provides a number of force impulses greater than one to occur against the tube surfaces for each complete revolution of the rotor about its axis. For the hula-hoop vibrator, the frequency step-up occurs whenever the diameter of the member about which the rotor orbits is less than the diameter of the rotor opening 66. This feature is fully explained in a patent to Svenson 2,194,410 and reference is made thereto for a complete understanding of the principle of operation of the frequency step-up utilized in the above described vibrator.

Figure 4:
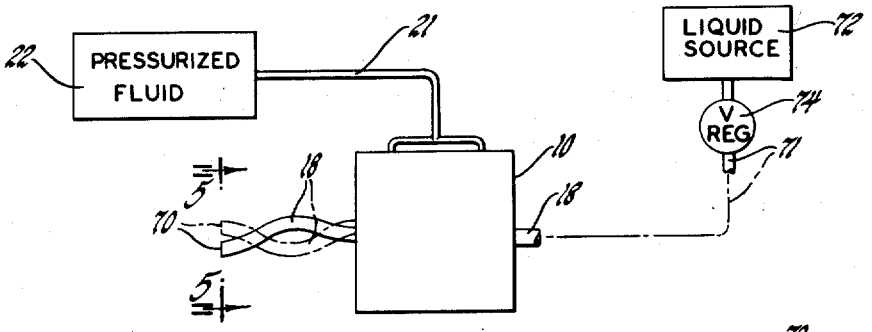
FIGURE 4 is a schematic diagram illustrating the atomizer of FIGURE 1 with the tube extension having an exaggerated gyratory standing wave created therein.

The clearance provided by the bores in the inner sections 34 of the vibrator permit the rotating force vector to cause an orbital deflection of the tube in the working chamber 40 which is transmitted to the portion of the tube extending beyond the housing and the outlet 70. Additionally, for maximum efficiency, the vibrator should be operated at a frequency approaching the resonant frequency of the tube, so as to create a gyratory type standing wave in the tube in a manner as illustrated in FIGURE 4 of the drawings. In standing wave vibration, the points of minimized vibration amplitude are termed nodes, and the points of maximized vibration amplitude are termed antinodes. When the tube is subjected to this type of vibration, it does not vibrate bodily or as a whole but elastically in a flexural wave form. As seen in FIGURES 1 and 4, the tube is supported at a nodal point while the nozzle 70 and rotor 64 are at antinode points. With this arrangement and during standing wave vibration, an increased deflection of the outlet 70 occurs which results in a centrifugal force of a magnitude capable of atomizing the liquid emanating from the nozzle into fine liquid particles.

In test runs of the atomizer shown in FIGURES 1–3, excellent atomization in the form of extremely fine, mist type liquid particles was obtained utilizing a thermoplastic resin tube having a working length (from point of tube support to tip of outlet) of 2.75", an inside passage diameter of 0.089" and an outside diameter of .187". The vibrator had a steel rotor weighting 0.004 pound, an inside diameter of 0.205", outside diameter of .600", and a width of 0.189". At an air pressure of 50 p.s.i., the vibrator operated at a frequency of 1760 cycles per second, causing a total nozzle deflection of 0.104"; total outlet or nozzle deflection being defined as the difference between the diameter of the orbit created by the outer surface of the outlet portion of the tube and the outside diameter of the tube.

In another test, the tube had an outside and inside diameter of 0.186" and 0.125" respectively, and a working length of 1.75". The rotor weighed 0.006 pound and was driven at a frequency of about 450 cycles per second. In this particular test the nozzle had a total deflection of approximately 0.095" and excellent atomization and dispersion of the liquid occurred. In another test, a rotor weighing 0.004 pound was employed with the same tube and equivalent atomization and dispersion was realized at approximately 600 cycles per second. In the latter test run, the total nozzle deflection was found to be approximately 0.085".

It should be apparent from the above that this atomizer allows a wide choice of tube sizes, rotor weight, and frequency of vibration for attaining excellent conical dispersion and atomization. It has been found that for most efficent operation, the vibrator should be operated above 300 cycles per second, and as aforementioned, in the resonant frequency range of the tube. As a practical matter, the only upper limit on the frequency of vibration would be that inherently imposed on a mechanical vibrator of the type utilized with this invention. Additionally, it should be noted that with this atomizer the liquid flow rate and, consequently, the quantity of liquid being atomized can be varied, though it will be understood that the flow rate should not exceed the capacity of the vibrator employed to furnish enough vibrating energy to the system to atomize the quantity of liquid being fed.

Figure 5:
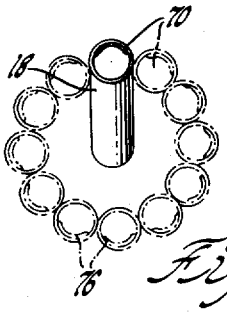
FIGURE 5 is a view taken on line 5—5 of FIGURE 4.

For illustrative purposes, FIGURE 5 shows the nozzle 70 following an orbital path of the type which is created during the operation of the vibrator. Here again it should be noted that the tube does not rotate about its axis while the vibrator is operating, since it is rigidly fixed in the bore 16. During test runs of the atomizer, it has been observed that, as the vibrator approaches a frequency which is capable of transmitting sufficient energy to the tube outlet for atomizing purposes, a parabolic depression with its vertex extending inside the tube is formed in the liquid at the tube outlet. As shown in FIGURES 8 and 9, the curved depression causes the liquid to be formed into a thin elongated liquid film 76 which is advanced towards the edge of the tube outlet in a crescent shape when viewed in cross-section. As the tube moves in the orbital path, the thin liquid crescent is located at a point on the tube inner wall which is most distant from the axis of the orbit and departs therefrom in the form of finely atomized particles. The latter is illustrated in FIGURE 5.

Figure 6:
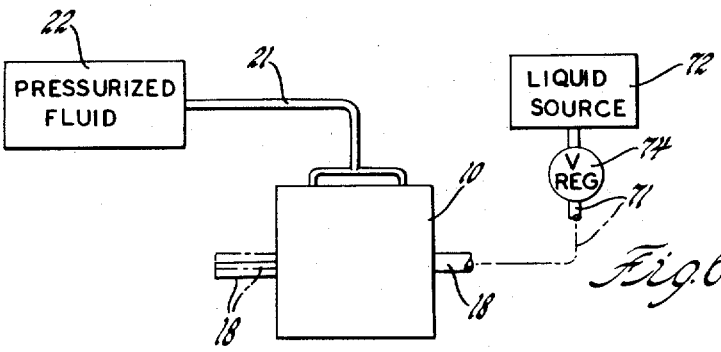
FIGURE 6 is a schematic diagram similar to FIGURE 4 with the tube extension being bodily gyrated.

Acceptable atomization can also be obtained when the vibrator is operated at a frequency above the resonant frequency of the tube. In this instance, as shown in FIGURE 6, the tube extension is bodily gyrated to produce the orbital movement of the nozzle as shown in FIGURE 5.

Various changes and modifications can be made in my apparatus without departing from the spirit of the invention. It should be understood that these changes and modifications are contemplated and therefore I do not wish to be limited in any manner except by the appended claims.

I claim:

1. A method for atomizing liquid from the free end of an elongated member having a passage comprising the steps of advancing a liquid through said passage towards said free end, and simultaneously forming said liquid into a thin film at said free end and gyrating said film by bodily orbiting a portion of said member at [a frequency equal to] the resonant frequency of the member whereby a standing gyratory wave is created in the body of the member and the liquid film is centrifugally atomized at the free end of the member.

2. An apparatus for atomizing liquid comprising a housing, a tube extending through said housing, said tube having a portion fixed in position in said housing and having a free end extending beyond said housing, means for supplying liquid to the free end of said tube at a controlled rate, and a high frequency vibrator coupled to said tube for [electrically] *elastically* driving the free end in an orbital path at a [frequency at least equal to the] resonant *standing wave* frequency of the tube to cause said liquid to be centrifugally atomized therefrom.

3. An apparatus for atomizing liquid comprising a housing, a tube extending through said housing, said tube having a portion fixed in position in said housing and having a free end extending beyond said housing, means for supplying liquid to the free end of said tube, and a high frequency vibrator coupled with said tube and located in said housing between said fixed position and the free end of said tube for driving the latter in an orbital path at a frequency above 100 cycles per second and [not less than the] *at a* resonant *standing wave* frequency of the tube to cause said liquid to be centrifugally atomized at the free end of the tube.

4. An apparatus for atomizing liquid comprising a housing, a tube extending through said housing, said tube having a portion fixed in position in said housing and having a free end extending beyond said housing, means for supplying liquid to the free end of said tube, a high frequency vibrator coupled with said tube and located between said fixed position and the free end of said tube, and fluid means for driving said vibrator to provide a rotating force vector which causes said free end to move in an orbital path at *a* [the] resonant *standing wave* frequency of the tube to cause said liquid to be centrifugally atomized at the free end of the tube.

5. An apparatus for atomizing liquid comprising a housing, a tube extending through said housing, said tube having a portion fixed in position in said housing and having a free end extending beyond said housing, means for supplying liquid to the free end of said tube, a vibrator having a ring type mass coupled to said tube, said mass adapted to generate a rotating force vector upon orbital movement in said housing, and means for driving said mass in said orbital path at a frequency above 100 cycles per second and [not less than the] *at a* resonant *standing wave* frequency of the tube to elastically gyrate said free end and thereby cause said liquid to be centrifugally atomized therefrom.

6. An apparatus for atomizing liquid comprising a source of pressurized fluid, a source of liquid, a housing, an elongated tube mounted in the housing and connected to the liquid source, one portion of said tube fixed in the housing so as to prevent rotation about the tube axis and the other end freely extending beyond the housing, a high frequency vibrator mounted in said housing and comprising a ring type rotor encircling a portion of the tube and located between the fixed portion and free end of the tube, a plurality of orifices formed in the housing, said orifices circumferentially spaced around said rotor and adapted to direct a stream of pressurized fluid tangentially against the rotor, means for connecting said source of pressurized fluid to the orifices, means for controlling the rate of liquid flow from the liquid source to the other end of the liquid tube, a passage formed in the housing for exhausting pressurized fluid therefrom, said pressurized fluid emanating from the orifices being adapted to drive the mass in an orbital path around the tube and cause an elastic gyratory movement of the other end of the tube at a speed sufficient to centrifugally atomize the liquid.

7. A method for atomizing liquid from the free end of an elongated member having a passage comprising the steps of advancing a liquid through said passage towards said free end, and simultaneously forming said liquid into a thin film at said free end and gyrating said film by bodily orbiting a portion of said member at a frequency above 100 cycles per second and [equal to the] *at a* resonant frequency of the member whereby a standing gyratory wave is created in the body of the member and the liquid film is centrifugally atomized at the free end of the member.

8. A method for atomizing liquid from the free end of an elongated member having a passage comprising the steps of advancing a liquid at a controlled rate towards said free end, and simultaneously forming said liquid into a thin C-shaped film and gyrating said film by driving the free end of said member in an orbital path at a frequency above 100 cycles per second and [not less than the] *at a* resonant *standing wave* frequency of the member whereby said liquid film is centrifugally atomized.

9. A method for atomizing liquid from the free end of an elongated member comprising the steps of advancing liquid towards said free end, maintaining a portion of said member in a fixed position, and bodily orbiting another portion of said member at a [frequency at least equal to the] resonant *standing wave* frequency of the member so as to create sufficient centrifugal force to atomize the liquid from said free end.

10. A method for atomizing liquid from the free end of an elongated elastic tubular member, comprising the steps of advancing the liquid towards the free end of said member at a controlled rate, constraining a portion of said member from movement in a direction transverse to the longitudinal axis of said member, gyrating the free end of said member at a [frequency at least equal to the] resonant *standing wave* frequency of the latter so as to simultaneously form said liquid at the free end of the member into a thin film and create sufficient centrifugal force to atomize the liquid film.

References Cited by the Examiner

The following references, cited by the Examiner, are of record in the patented file of this patent or the original patent.

UNITED STATES PATENTS

| | | | |
|---|---|---|---|
| 437,118 | 9/90 | Hoyt | 239—229 |
| 2,194,410 | 3/40 | Svenson | 239—102 |
| 2,909,325 | 10/59 | Hunter | 239—206 |
| 2,960,314 | 11/60 | Bodine | 239—102 |

FOREIGN PATENTS 653,393 11/57 Germany.

EVERETT W. KIRBY, *Primary Examiner.*

LOUIS J. DEMBO, *Examiner.*